(12) United States Patent
Sasaki (10) Patent No.: US 12,321,650 B2
(45) Date of Patent: Jun. 3, 2025

(54) INFORMATION PROCESSING APPARATUS FOR ADDING HIGH-CONFIDENTIALITY INFORMATION TO FIRST PAGE OF PRINTING DATA THAT CONTAINS HIGHLY CONFIDENTIAL DATA, PRINTING SYSTEM, AND NON-TRANSITORY COMPUTER READABLE MEDIUM

(71) Applicant: FUJIFILM Business Innovation Corp., Tokyo (JP)

(72) Inventor: Hirofumi Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 419 days.

(21) Appl. No.: 17/702,797

(22) Filed: Mar. 24, 2022

(65) Prior Publication Data

US 2023/0079024 A1  Mar. 16, 2023

(30) Foreign Application Priority Data

Sep. 10, 2021   (JP) .................................. 2021-148038

(51) Int. Cl.
*G06F 3/12* (2006.01)
(52) U.S. Cl.
CPC .......... *G06F 3/1222* (2013.01); *G06F 3/1238* (2013.01); *G06F 3/1243* (2013.01)

(58) Field of Classification Search
None
See application file for complete search history.

(56) References Cited

U.S. PATENT DOCUMENTS

| | | | |
|---|---|---|---|
| 7,758,144 B2* | 7/2010 | Hagiwara | G06F 3/1285 347/15 |
| 2009/0064275 A1* | 3/2009 | Eguchi | G06F 21/608 726/2 |
| 2009/0161993 A1* | 6/2009 | Matsunoshita | H04N 1/00846 382/305 |
| 2012/0162681 A1* | 6/2012 | Tomita | G06F 3/1288 358/1.14 |
| 2013/0050748 A1* | 2/2013 | Tsuchitoi | G06F 3/0321 358/1.15 |
| 2018/0181349 A1* | 6/2018 | Condon | G06F 3/1222 |
| 2018/0270387 A1* | 9/2018 | Furuta | G06F 3/1294 |

FOREIGN PATENT DOCUMENTS

JP      2003337687      11/2003

* cited by examiner

*Primary Examiner* — Haris Sabah
(74) *Attorney, Agent, or Firm* — JCIPRNET (57) ABSTRACT

An information processing apparatus includes a processor configured to: create individual pages of printing data by combining plural pieces of source data containing highly confidential data with high confidentiality in accordance with a printing instruction received from a terminal apparatus; and add high-confidentiality information indicating high confidentiality to a page of the printing data that contains the highly confidential data.

20 Claims, 7 Drawing Sheets

INFORMATION PROCESSING APPARATUS FOR ADDING HIGH-CONFIDENTIALITY INFORMATION TO FIRST PAGE OF PRINTING DATA THAT CONTAINS HIGHLY CONFIDENTIAL DATA, PRINTING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-148038 filed Sep. 10, 2021.

BACKGROUND

(i) Technical Field

The present disclosure relates to an information processing apparatus, a printing system, and a non-transitory computer readable medium.

(ii) Related Art

As a related art, a technique for, in the case where print data is transferred to an image forming apparatus not provided with a security function, adding security information to the print data to be transferred, is disclosed in Japanese Unexamined Patent Application Publication No. 2003-337687.

SUMMARY

In the case where a plurality of pieces of source data containing highly confidential information are combined together to create printing data, it may be difficult to identify which page of the printing data is a highly confidential page.

Aspects of non-limiting embodiments of the present disclosure relate to enabling a highly confidential page to be identified in the case where a plurality of pieces of source data are combined together to create printing data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: create individual pages of printing data by combining a plurality of pieces of source data containing highly confidential data with high confidentiality in accordance with a printing instruction received from a terminal apparatus; and add high-confidentiality information indicating high confidentiality to a page of the printing data that contains the highly confidential data.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments of the present disclosure will be described with reference to the attached drawings.

First Exemplary Embodiment

<Printing System>

Figure 1:
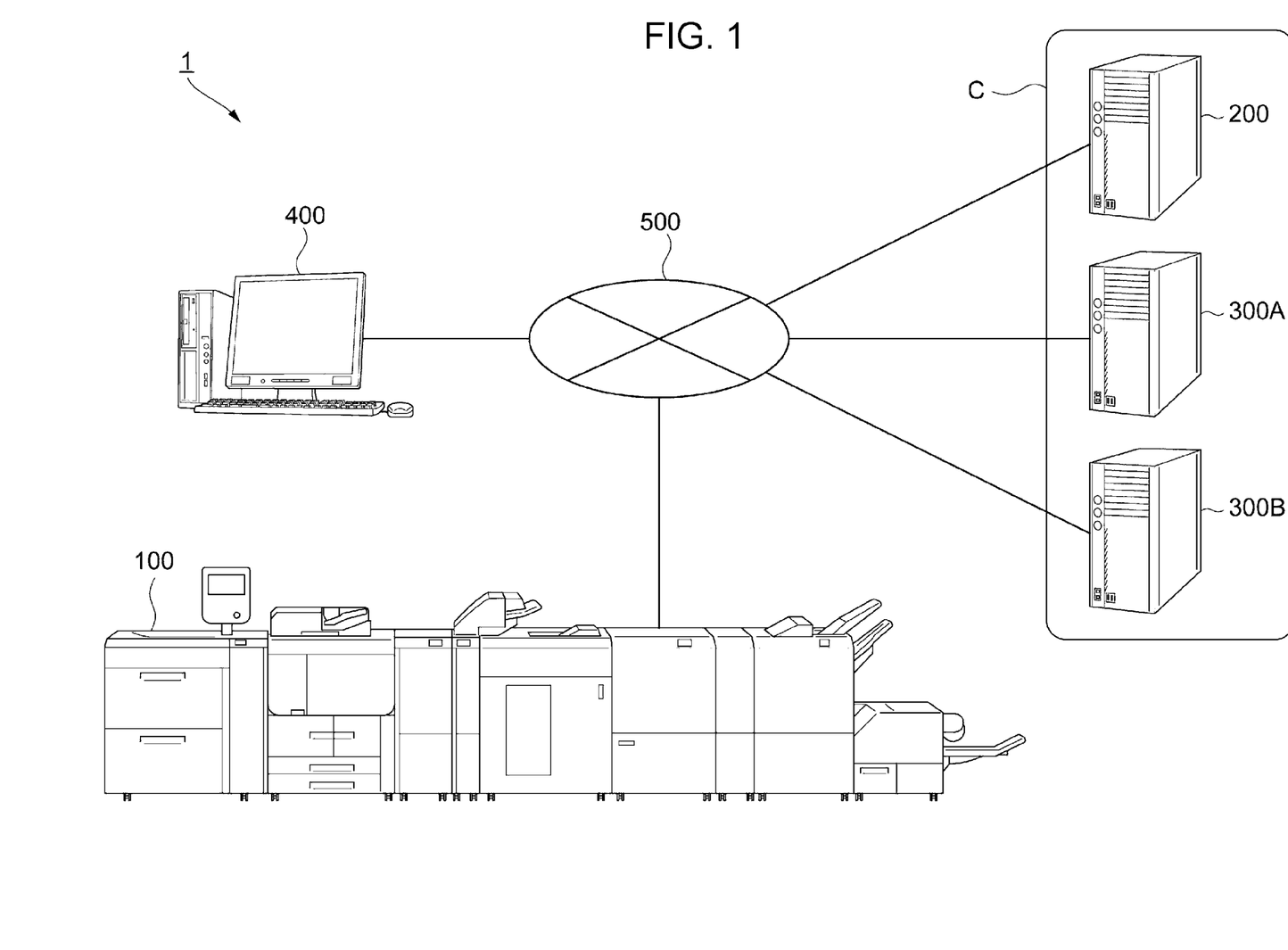
FIG. 1 is a diagram illustrating an example of the entire configuration of a printing system according to an exemplary embodiment.

FIG. 1 is a diagram illustrating an example of the entire configuration of a printing system 1 according to an exemplary embodiment. As illustrated in FIG. 1, the printing system 1 includes a printer 100. The printing system 1 also includes a page creation server 200 and image conversion servers 300A and 300B that are provided on a cloud C. The printing system 1 also includes a terminal apparatus 400 that a user of the printing system 1 or the like operates. In the printing system 1, the printer 100, the page creation server 200, the image conversion servers 300A and 300B, and the terminal apparatus 400 are connected via a communication line 500 such as an internet line.

In the printing system 1 according to this exemplary embodiment, the printer 100, the page creation server 200, and the image conversion servers 300A and 300B cooperate to execute a print job received from the terminal apparatus 400 or the like. Furthermore, in the printing system 1 according to this exemplary embodiment, the page creation server 200 and the image conversion servers 300A and 300B that are provided on the cloud C provide a service for controlling printing by the printer 100 as a cloud service.

In the printing system 1 illustrated in FIG. 1, a printer 100 and a terminal apparatus 400 are connected to the cloud C (the page creation server 200 and the image conversion servers 300A and 300B). However, the present disclosure is not limited to this configuration. In the printing system 1, a plurality of printers 100 and a terminal apparatus 400 may be connected to the cloud C, a printer 100 and a plurality of terminal apparatuses 400 may be connected to the cloud C, or a plurality of printers 100 and a plurality of terminal apparatuses 400 may be connected to the cloud C.

Furthermore, the printing system 1 may include a plurality of page creation servers 200. The printing system 1 may include an image conversion server 300 or three or more image conversion servers 300. In the description provided below, in the case where the image conversion servers 300A and 300B do not need to be distinguished from each other, they will be simply referred to as image conversion servers 300.

<Printer>

The printer 100 prints an image on paper, which is an example of a recording medium, on the basis of an acquired print job.

The printer 100 is, for example, a so-called production printer used for business printing. The printer 100 may include a scan function, a copy function, a postprocessing function, and the like as well as a print function for printing images on paper. Postprocessing includes, for example, binding processing for binding a bundle of paper, folding processing for folding paper, cutting processing for cutting paper, punch processing for punching a hole in paper, and the like.

The printer 100 is not necessarily a production printer and may be a typical printer (a business printer, a home printer, or the like).

Figure 2:
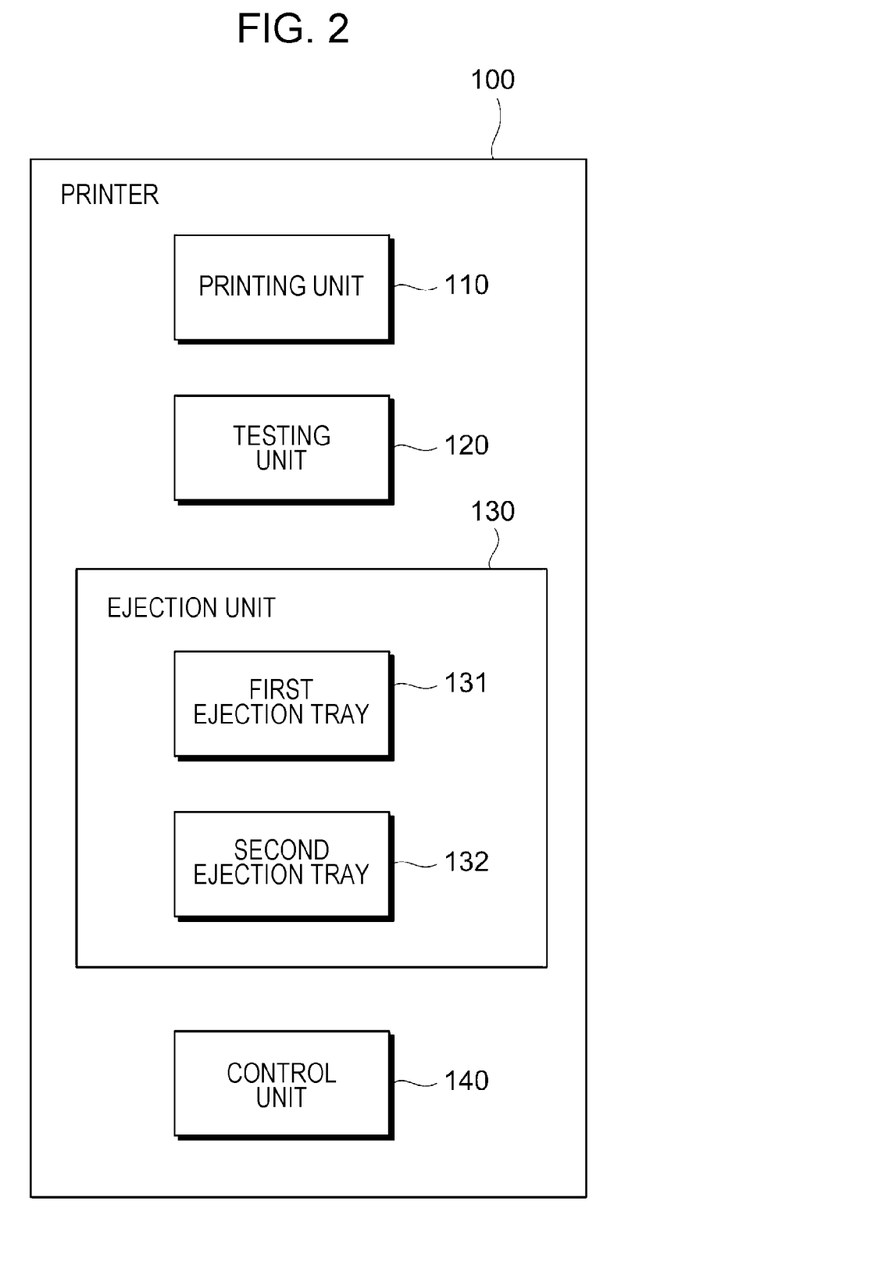
FIG. 2 is a diagram illustrating an example of the configuration of a printer.

FIG. 2 is a diagram illustrating an example of the configuration of the printer 100.

The printer 100 according to this exemplary embodiment includes a printing unit 110 that prints an image on paper, a testing unit 120 that tests an image printed on paper by the printing unit 110, an ejection unit 130 to which paper on which printing has been performed by the printing unit 110 is ejected, and a control unit 140 that controls the units of the printer 100.

The printing unit 110 prints an image on paper in, for example, an electrophotographic method. A printing method performed by the printing unit 110 is not particularly limited. For example, an image may be printed on paper in an inkjet method.

The testing unit 120 tests an image printed on paper by the printing unit 110. Specifically, the testing unit 120 reads an image printed on paper by the printing unit 110. The testing unit 120 tests whether or not a failure has occurred in an image formed on paper, by comparing the read image with an image for which an instruction to perform printing has been issued as a print job (a rasterized image, which will be described later).

As described in detail later, in the case where paper on which a page containing an HS flag, which will be described later, is printed is tested, the testing unit 120 according to this exemplary embodiment is able to achieve high accuracy in detection, compared to the case where paper on which a page not containing an HS flag is printed is tested.

The ejection unit 130 includes a first ejection tray 131 and a second ejection tray 132 to which paper on which an image has been printed by the printing unit 110 is ejected. In the ejection unit 130 in this exemplary embodiment, the degree of confidentiality of the first ejection tray 131 is higher than the degree of confidentiality of the second ejection tray 132. For example, the first ejection tray 131 is provided with a key, and only a user who owns the key is able to pick up paper ejected to the first ejection tray 131. In contrast, the second ejection tray 132 is not provided with a key, and any user is able to pick up paper ejected to the second ejection tray 132.

<Terminal Apparatus>

The terminal apparatus 400 is a computer apparatus that a user using the printing system 1 or the like operates. The terminal apparatus 400 is, for example, a personal computer (PC). The terminal apparatus 400 includes a central processing unit (CPU), a read only memory (ROM), and a random access memory (ROM), which are not illustrated in the drawings. The ROM stores a control program to be executed by the CPU. The CPU reads the control program stored in the ROM and executes the control program using the RAM as an operation area.

The terminal apparatus 400 generates a print job in accordance with an operation performed by a user. The terminal apparatus 400 outputs the print job to the page creation server 200 via the communication line 500. The print job is an example of a printing instruction and is a unit of a series of printing processes performed in the printing system 1.

A print job contains identification information such as a job ID for identifying the print job, printing source data as a source of an image to be formed on paper on the basis of the print job, and condition information about a condition of the print job.

The printing source data is data as a source of an image to be formed on paper and is in, for example, page description language (PDL) format. In this exemplary embodiment, the printing source data contains one or more pieces of document data to be imposed on paper and a database containing a plurality of objects to be inserted into predetermined document data. An object as an example of an element to be inserted into predetermined document data is managed for each item in the database. The format of document data or an object contained in a database is not particularly limited. The format of document data or an object is, for example, image data, text data, numeric value data, graphic data, or the like.

Furthermore, in this exemplary embodiment, high-confidentiality information indicating high confidentiality is added to highly confidential data with high confidentiality among one or more pieces of printing source data.

The high-confidentiality information represents information for allowing an apparatus such as the page creation server 200 or the image conversion server 300 that receives data to be able to recognize, on the basis of the high-confidentiality information, that the data is highly confidential. The format of the high-confidentiality information is not particularly limited. In this example, a high security (HS) flag, which is an example of high-confidentiality information, is added to highly confidential data with high confidentiality among one or more pieces of printing source data.

For example, an HS flag is added to document data with high confidentiality among one or more pieces of document data. Alternatively, an HS flag is added to an item to which an object with high confidentiality belongs in the database.

In this exemplary embodiment, for example, when operating the terminal apparatus 400 to input a print job, the user selects highly confidential data from one or more pieces of printing source data. Then, the terminal apparatus 400 adds an HS flag to the selected highly confidential data. For example, the terminal apparatus 400 may analyze printing source data and add an HS flag to specific data on the basis of an analysis result.

An HS flag added to printing source data will be described in detail later.

The condition information represents a condition for setting a mode of printing to be performed by the printer 100. The condition information is, for example, information about the size of paper, the number of pages of document data to be arranged in a sheet of paper, the order of document data to be arranged in a sheet of paper, single-sided printing or double-sided printing, and the number of copies of printing. However, the condition information is not limited to the above-mentioned examples.

In the description provided below, of condition information, information about the number of pages of document data to be arranged in a sheet of paper and information about the order of document data to be arranged in a sheet of paper may be expressed together as imposition information.

<Page Creation Server>

Figure 3:
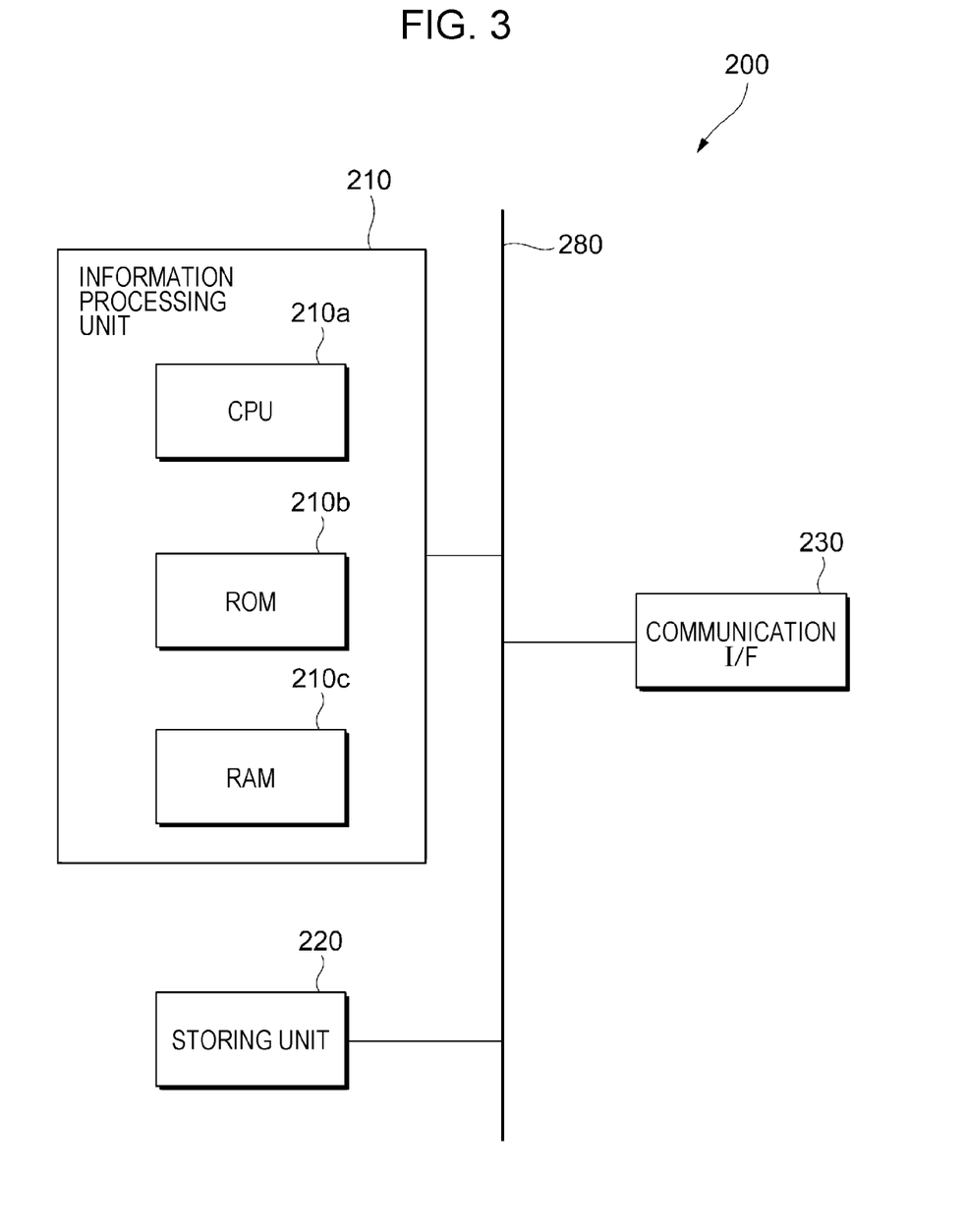
FIG. 3 is a diagram illustrating an example of the hardware configuration of a page creation server.

Next, a hardware configuration of the page creation server 200 will be described. FIG. 3 is a diagram illustrating an example of the hardware configuration of the page creation server 200.

As illustrated in FIG. 3, the page creation server 200 includes an information processing unit 210 that processes information, a storing unit 220 that stores information, and a communication interface (communication I/F) 230 that implements communication. In the page creation server 200, the information processing unit 210, the storing unit 220, and the communication I/F 230 are connected to a bus 280 and transmit and receive data via the bus 280.

As illustrated in FIG. 3, the information processing unit 210 includes a CPU 210*a*, a ROM 210*b*, and a RAM 210*c*.

The CPU 210*a* is an example of a processor. The CPU 210*a* implements functions of the page creation server 200, which will be described later, by loading various programs stored in the ROM 210*b* or the like onto the RAM 210*c* and executes the programs. The RAM 210*c* is a memory that is used as an operation memory or the like for the CPU 210*a*. The ROM 210*b* is a memory that stores various programs and the like to be executed by the CPU 210*a*.

A program to be executed by the CPU 210*a* may be stored in a computer-readable recording medium such as a magnetic recording medium (a magnetic tape, a magnetic disk, or the like), an optical recording medium (an optical disc or the like), a magneto-optical recording medium, or a semiconductor memory and provided. Furthermore, a program to be executed by the CPU 210*a* may be provided through communication means such as the Internet.

The page creation server 200 is an example of an information processing apparatus. The page creation server 200 receives a print job transmitted from the terminal apparatus 400, and creates printing data to be used for printing at the printer 100 by combining a plurality of pieces of printing source data on the basis of the print job.

Specifically, the page creation server 200 imposes document data of printing source data on individual pages of printing data on the basis of condition information containing the imposition information described above. Furthermore, the page creation server 200 inserts an object in the database into predetermined document data.

A page of printing data represents a page printed on a single plane of a sheet of paper when printing of the printing data is performed at the printer 100.

Furthermore, in the case where the printing source data contains highly confidential data with high confidentiality, the page creation server 200 adds high-confidentiality information indicating high confidentiality to a page containing the highly confidential data of the created printing data.

The highly confidential data represents data that is able to be recognized as being highly confidential by the page creation server 200. In this example, printing source data to which the above-described HS flag is added corresponds to highly confidential data.

In the case where document data to which the above-described HS flag is added exists among one or more pieces of document data as printing source data, the page creation server 200 adds the HS flag as an example of high-confidentiality information to a page of created printing data on which the document data to which the HS flag is added is imposed. In other words, the page creation server 200 causes a page of the printing data on which the document data to which the HS flag is added is imposed to inherit the HS flag added to the document data.

Furthermore, in the case where an item to which the HS flag is added exists in a database as printing source data, the page creation server 200 adds the HS flag as an example of high-confidentiality information to a page of created printing data in which an object belonging to the item to which the HS flag is added is inserted. In other words, the page creation server 200 causes a page of the printing data in which the object belonging to the item to which the HS flag is added is inserted to inherit the HS flag added to the item of the database.

In the case where an HS flag is added to a page of printing data containing highly confidential data, the page creation server 200 may add, for example, different HS flags to print jobs. Furthermore, in the case where an HS flag is added to a page of printing data containing highly confidential data, the page creation server 200 may add, for example, different HS flags for terminal apparatuses 400 that have issued instructions for executing print jobs.

In this case, the printer 100, the image conversion server 300, or the like that receives printing data is able to identify, on the basis of an HS flag, a print job or a terminal apparatus 400 that has issued an instruction for executing a print job.

The page creation server 200 outputs the created printing data to the image conversion server 300. In this example, the page creation server 200 outputs created printing data of multiple pages to the image conversion server 300A and the image conversion server 300B in a divided manner. In other words, the page creation server 200 outputs, of the created printing data of multiple pages, a page containing an HS flag to the image conversion server 300A and a page not containing an HS flag to the image conversion server 300B.

A specific example of a process performed by the page creation server 200 will be described later.

<Image Conversion Server>

Next, a configuration of the image conversion servers 300 (the image conversion servers 300A and 300B) will be described. The image conversion server 300A and the image conversion server 300B basically have a similar configuration. In the case where the image conversion server 300A and the image conversion server 300B do not need to be distinguished from each other, they will be simply referred to as the image conversion servers 300.

Each of the image conversion servers 300 is an example of a processing device and is a server apparatus on the cloud C. As with the page creation server 200, the image conversion server 300 includes an information processing unit including a CPU, a ROM, and a RAM, a storing unit, and a communication I/F, which are not illustrated in the drawings. The information processing unit, the storing unit, and the communication I/F are connected to a bus. The CPU is another example of a processor. The CPU implements functions of the image conversion server 300 by loading various programs stored in the ROM or the like onto the RAM and executing the programs. The RAM is a memory that is used as an operation memory or the like for the CPU. The ROM is a memory that stores various programs and the like to be executed by the CPU.

In this exemplary embodiment, the image conversion server 300A and the image conversion server 300B have different levels of confidentiality with respect to the outside of the cloud C. In this example, the level of confidentiality of the image conversion server 300A is higher than the level of confidentiality of the image conversion server 300B.

As described above, in this example, the page creation server 200 outputs a page of printing data to which an HS flag is added to the image conversion server 300A, and outputs a page of the printing data to which an HS flag is not added to the image conversion server 300B.

Each of the image conversion servers 300 performs rasterization processing on each page of the printing data received from the page creation server 200. Then, each of the image conversion servers 300 outputs a rasterized image, which is an image obtained by performing rasterization processing on the page of the printing data, to the printer 100.

In the case where the page of the printing data received from the page creation server 200 contains an HS flag, each of the image conversion servers 300 causes a rasterized image on which rasterization processing has been performed to inherit the HS flag. In this example, the image conversion server 300A causes a rasterized image for which rasterization processing has been performed to inherit an HS flag added to a page of printing data received from the page creation server 200.

In this exemplary embodiment, rasterization processing for individual pages of printing data created by the page creation server 200 is able to be performed concurrently by the image conversion server 300A and the image conversion server 300B. Accordingly, for example, compared to the case where, for example, rasterization processing for all the pieces of printing data is performed by a single image conversion server 300, the productivity of a printing process is improved.

In the case where printing data is created by combining a plurality of pieces of printing source data containing highly confidential data with high confidentiality, it may be difficult to identify which part of the printing data is highly confidential. For example, in the case where printing data of multiple pages is created by combining a plurality of pieces of printing source data by imposition or the like, it may be difficult to identify which page of the printing data is a highly confidential page.

In contrast, in this exemplary embodiment, in the case where printing data is created by combining a plurality of documents, the page creation server 200 adds an HS flag, which is an example of high-confidentiality information indicating high confidentiality, to a page containing highly confidential data with high confidentiality.

<Process Performed by Page Creation Server>

Next, an operation of the page creation server 200 performed in the case where an instruction to execute a print job is issued from the terminal apparatus 400 or the like will be described specifically by paying attention to processing by the information processing unit 210 of the page creation server 200.

Figure 4:
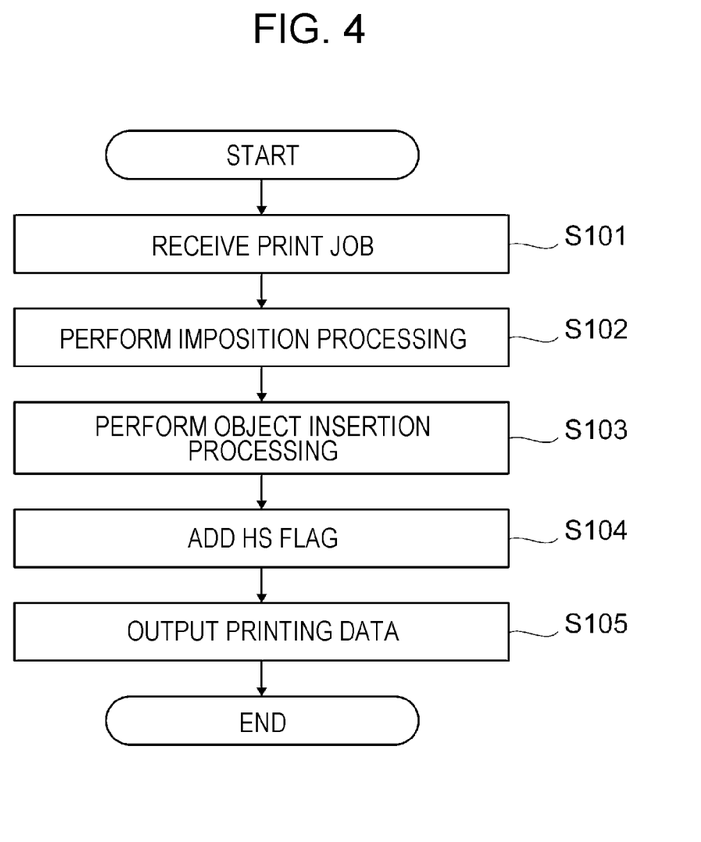
FIG. 4 is a flowchart illustrating the procedure of a process performed by the page creation server when an instruction for executing a print job is issued.
Figure 5:
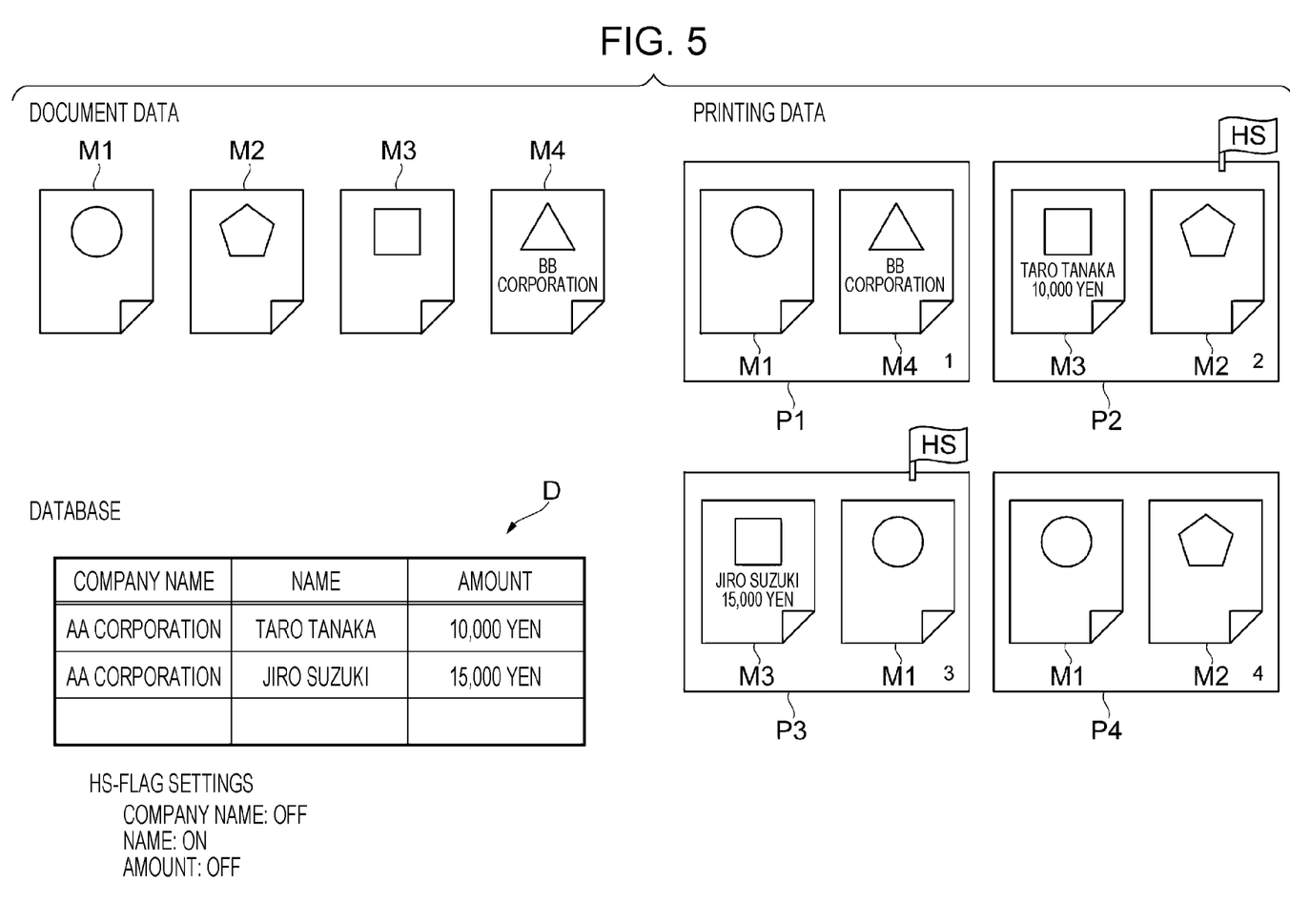
FIG. 5 is a diagram for explaining a process performed by the page creation server.
Figure 6:
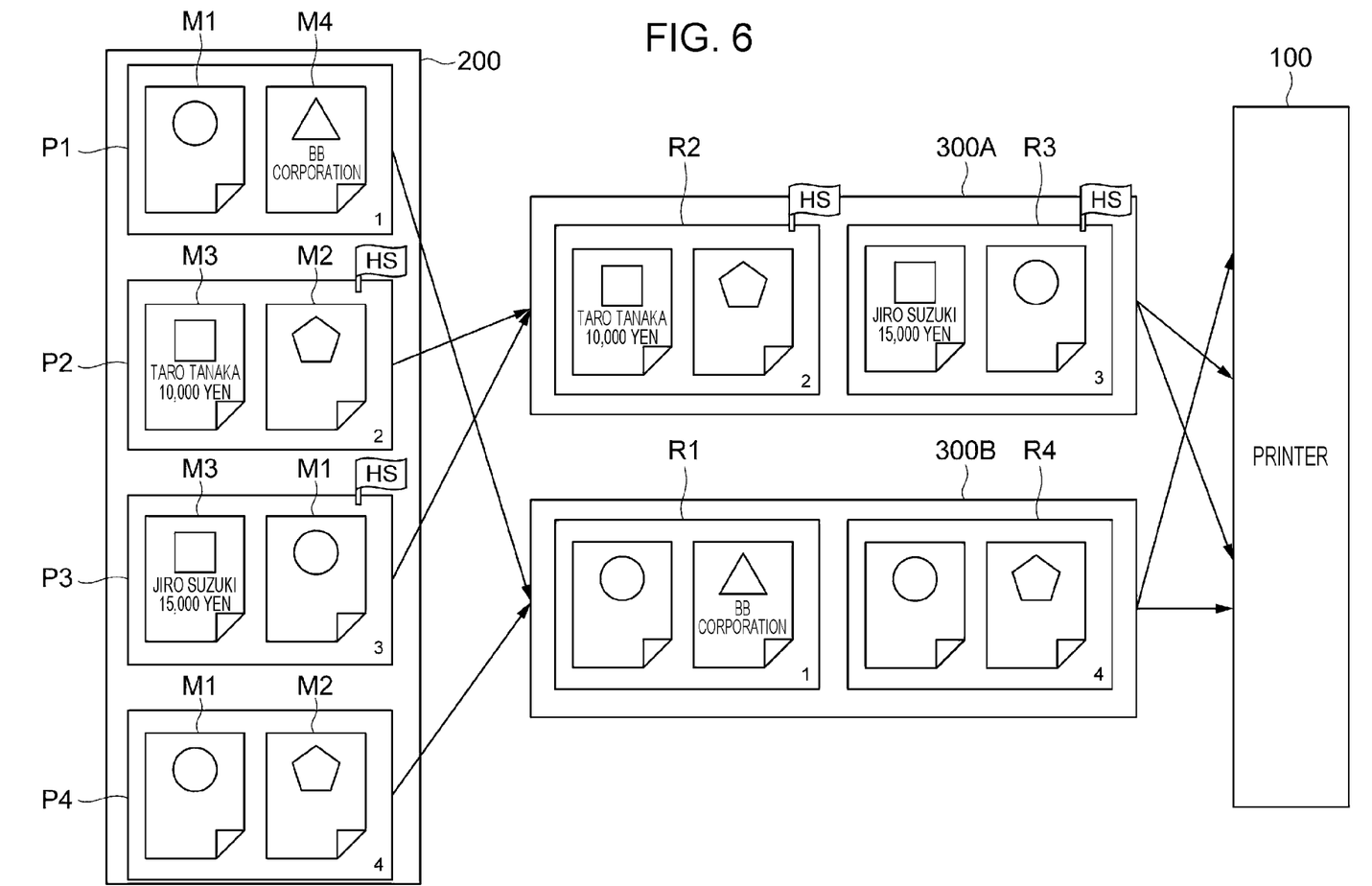
FIG. 6 is a diagram for explaining the flow of data among the page creation server, image conversion servers, and the printer when an instruction for executing a print job is issued.

FIG. 4 is a flowchart illustrating the procedure of a process performed by the page creation server 200 when an instruction for executing a print job is issued. FIG. 5 is a diagram for explaining a process performed by the page creation server 200. FIG. 6 is a diagram for explaining the flow of data among the page creation server 200, the image conversion servers 300, and the printer 100 when an instruction for executing a print job is issued.

First, the page creation server 200 receives a print job from the terminal apparatus 400 (step 101).

Specifically, the page creation server 200 receives, as a print job, identification information for identifying the print job, printing source data as a source of an image to be formed on paper on the basis of the print job, and condition information, which is information about a condition for the print job from the terminal apparatus 400.

In this example, as illustrated in FIG. 5, the page creation server 200 receives, as the printing source data, a plurality of pieces of (in this example, four) document data (first document data M1, second document data M2, third document data M3, and fourth document data M4).

Furthermore, the page creation server 200 receives a database D as the printing source data. The database D illustrated in FIG. 5 includes, as items, "company name", "name", and "amount". A plurality of objects to be inserted into document data belong to items of the database D. In the database D, addition or non-addition (ON or OFF) of an HS flag, which is an example of high-confidentiality information, is set for each item. In this example, an HS flag is added to the item "name" out of the items of the database D (in other words, the HS flag is ON), and no HS flag is added to each of the item "company name" and the item "amount" out of the items of the database D (in other words, the HS flag is OFF).

Furthermore, as described above, the page creation server 200 receives condition information containing imposition information, which includes information about the number of pages of document data to be arranged in a sheet of paper and information about the order of document data to be arranged in a sheet of paper, from the terminal apparatus 400.

Next, the page creation server 200 imposes the document data on the basis of the imposition information and the like acquired in step 101 (step 102).

In this example, as illustrated in FIG. 5, the page creation server 200 arranges two pages of document data in each page of the printing data on the basis of the imposition information. Specifically, the page creation server 200 imposes the first document data M1 and the fourth document data M4 of the document data to create a first page P1 of the printing data. In a similar manner, the page creation server 200 imposes the third document data M3 and the second document data M2 of the document data to create a second page P2 of the printing data. In a similar manner, the page creation server 200 imposes the third document data M3 and the first document data M1 of the document data to create a third page P3 of the printing data. In a similar manner, the page creation server 200 imposes the first document data M1 and the second document data M2 of the document data to create a fourth page P4 of the printing data.

Next, the page creation server 200 inserts objects in the database D into the document data imposed on the pages of the printing data in step 102 (step 103).

In this example, as illustrated in FIG. 5, the page creation server 200 inserts objects belonging to "name" and "amount" in the database D into the third document data M3 imposed on the second page P2 of the printing data and into the third document data M3 imposed on the third page P3 of the printing data. Specifically, the page creation server 200 inserts an object "Taro Tanaka" belonging to the item "name" in the database D and an object "10,000 yen" belonging to the item "amount" in the database D into the third document data M3 imposed on the second page P2 of the printing data. In a similar manner, the page creation server 200 inserts an object "Jiro Suzuki" belonging to the item "name" in the database D and an object "15,000 yen" belonging to the item "amount" in the database D into the third document data M3 imposed on the third page P3 of the printing data.

Next, the page creation server 200 adds an HS flag, which is an example of high-confidentiality information indicating high confidentiality, to a page of the printing data that contains highly confidential data with high confidentiality (step 104).

In this example, as described above, an HS flag is added in advance to the item "name" in the database D of the printing source data. In other words, in this example, the object belonging to the item "name" in the database D of the printing source data is highly confidential data.

Thus, as illustrated in FIG. 5, the page creation server 200 adds an HS flag (indicated as "HS" in FIG. 5) to each of the second page P2 and the third page P3 of the created printing data in which the objects belonging to the item "name" in the database D are inserted. In other words, the page creation server 200 causes the HS flags added to the item "name" in the database D of the printing source data to be inherited to the second page P2 and the third page P3 of the printing data in which the objects belonging to the item "name" in the database D is inserted.

Next, the page creation server 200 outputs the created printing data to the image conversion servers 300 (step 105).

The page creation server 200 divides the created printing data and outputs the divided printing data to the image conversion servers 300. In this example, as illustrated in FIG. 6, the page creation server 200 outputs the second page P2 and the third page P3 of the printing data to which the HS flags are added in step 104 to the image conversion server 300A. Furthermore, the page creation server 200 outputs the first page P1 and the fourth page P4 of the printing data to which no HS flag is added in step 104 to the image conversion server 300B.

Furthermore, the page creation server 200 may output the identification information and the condition information that are included in the print job along with the printing data to the image conversion server 300.

Thus, the series of processing operations by the page creation server 200 is completed.

As described above, in this exemplary embodiment, in the case where the page creation server 200 creates each page of printing data by combing a plurality of pieces of printing source data, addition of an HS flag to a page containing highly confidential data enables a highly confidential page to be identified.

<Process Performed by Image Conversion Servers>

Next, a process performed by the image conversion servers 300 will be described.

The image conversion servers 300 acquire printing data output from the page creation server 200. In this example, the image conversion server 300A acquires the second page P2 and the third page P3 of the printing data to which an HS flag is added. The image conversion server 300B acquires the first page P1 and the fourth page P4 of the printing data to which no HS flag is added.

Then, the image conversion servers 300 perform rasterization processing on the acquired printing data to create rasterized images.

In this example, the image conversion server 300A performs rasterization processing on the second page P2 and the third page P3 of the printing data to create rasterized images. The image conversion server 300B performs rasterization processing on the first page P1 and the fourth page P4 of the printing data to create rasterized images. Hereinafter, rasterized images obtained by performing rasterization processing on the first page P1, the second page P2, the third page P3, and the fourth page P4 of the printing data may be referred to as a first rasterized image R1, a second rasterized image R2, a third rasterized image R3, and a fourth rasterized image R4, respectively.

As described above, in the printing system 1 according to this exemplary embodiment, the level of confidentiality of the image conversion server 300A is higher than the level of confidentiality of the image conversion server 300B. Thus, by causing the image conversion server 300A to perform rasterization processing on the second page P2 and the third page P3 of the printing data to which HS flags are added, leakage of highly confidential data contained in the second page P2 and the third page P3 to the outside is prevented compared to the case where rasterization processing on the second page P2 and the third page P3 is performed by the image conversion server 300B. Furthermore, because no HS flag is added to each of the first page P1 and the fourth page P4 and neither the first page P1 nor the fourth page P4 contains highly confidential data, trouble is less likely to occur even if rasterization processing is performed by the image conversion server 300B with a confidentiality lower than that of the image conversion server 300A.

In the case where an HS flag is added to a page of printing data as a target for which rasterization processing is to be performed, the image conversion server 300 causes a rasterized image on which the rasterization processing has been performed to inherit the HS flag.

In this example, as illustrated in FIG. 6, the image conversion server 300A causes the HS flags added to the second page P2 and the third page P3 of the printing data to be inherited to the second rasterized image R2 and the third rasterized image R3 on which rasterization processing has been performed.

Then, the image conversion server 300 outputs the created rasterized images to the printer 100.

In this example, as illustrated in FIG. 6, the image conversion server 300A outputs the second rasterized image R2 and the third rasterized image R3 to the printer 100. In a similar manner, the image conversion server 300B outputs the first rasterized image R1 and the fourth rasterized image R4 to the printer 100.

For outputting a rasterized image to which an HS flag is added to the printer 100, the image conversion server 300 may transmit identification information to the printer 100. In the case where the identification information is authenticated at the printer 100, the image conversion server 300 may output the rasterized image to which the HS flag is added to the printer 100.

In this example, before outputting the second rasterized image R2 and the third rasterized image R3 to the printer 100, the image conversion server 300A outputs identification information for identifying the print job to the printer 100. The printer 100 performs authentication processing by comparing identification information about a print job received in advance from the terminal apparatus 400 or the like for execution of the print job with the identification information received from the image conversion server 300A. In the case where the identification information received in advance from the terminal apparatus 400 and the identification information received from the image conversion server 300A are the same, the printer 100 permits the image conversion server 300A to output rasterized images. In accordance with the permission from the printer 100, the image conversion server 300A outputs the second rasterized image R2 and the third rasterized image R3 to which HS flags are added to the printer 100.

In contrast, in the case where the printer 100 does not have the same identification information as the identification information received from the image conversion server 300A, the printer 100 does not permit the image conversion server 300A to output a rasterized image. In this case, the image conversion server 300A outputs neither the second rasterized image R2 nor the third rasterized image R3 to which HS flags are added to the printer 100.

Accordingly, for example, outputting of a rasterized image containing highly confidential data to an apparatus different from the printer 100 to which a user has issued an instruction to perform printing based on a print job is prevented.

Thus, the process performed by the image conversion server 300 ends.

<Process Performed by Printer>

In the printer 100, the control unit 140 acquires rasterized images output from the image conversion servers 300 and combines the acquired rasterized images to create rasterized data composed of the rasterized images. Then, the printing unit 110 of the printer 100 prints the rasterized images on paper on the basis of the combined rasterized data.

In this exemplary embodiment, at the time of printing a rasterized image to which an HS flag is added on paper, the printing unit 110 of the printer 100 prints a high-confidentiality image indicating high confidentiality on the paper. The high-confidentiality image is, for example, a watermark or a background image indicating high confidentiality. However, high-confidentiality images are not particularly limited. Accordingly, when a user views paper on which a rasterized image to which an HS flag is added is printed, the user is able to recognize that the rasterized image is highly confidential.

Next, in the printer 100, the testing unit 120 tests the images printed on the paper by the printing unit 110. In this exemplary embodiment, it is desirable that the testing unit 120 perform testing of an image obtained by printing a rasterized image to which an HS flag is added at a higher accuracy than testing of an image obtained by printing a rasterized image to which an HS flag is not added. For example, in the case where the testing unit 120 reads, for the purpose of testing, images printed on paper, the resolution for reading an image obtained by printing a rasterized image to which an HS flag is added is set higher than the resolution for reading an image obtained by printing a rasterized image to which an HS flag is not added. Accordingly, ejection of paper on which a defective image obtained by printing a rasterized image to which an HS flag is added is printed is prevented.

Next, in the printer 100, the printing unit 110 prints the rasterized images and ejects a printed material composed of a plurality of sheets of paper for which testing of images has been performed at the testing unit 120 to the ejection unit 130. In this exemplary embodiment, in the case where rasterized data contains a rasterized image to which an HS flag is added, a printed material is ejected to the first ejection tray 131. In other words, in the printing system 1 according to this exemplary embodiment, in the case where printing source data of a print job contains highly confidential data, a printed material obtained based on the print job is output to the first ejection tray 131. As described above, the level of confidentiality of the first ejection tray 131 is higher than the level of confidentiality of the second ejection tray 132. Thus, a printed material obtained based on a print job containing highly confidential data is prevented from being viewed by a user or the like different from a user who has issued an instruction to execute the print job.

<Another Example of Process Performed by Page Creation Server 200>

Figure 7:
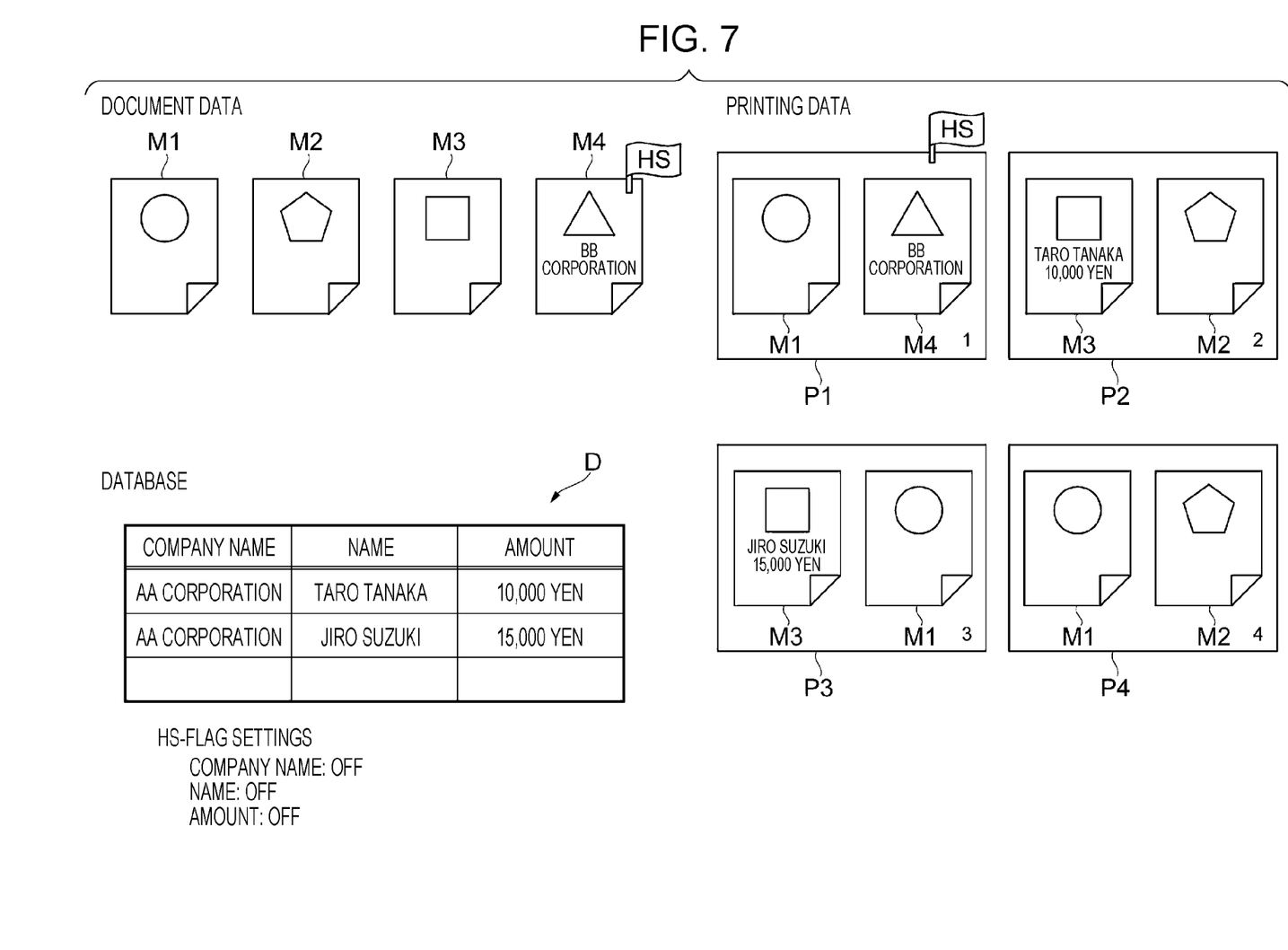
FIG. 7 is a diagram for explaining a process performed by the page creation server.

Next, another example of the process performed by the information processing unit 210 of the page creation server 200 will be described. FIG. 7 is a diagram for explaining a process performed by the page creation server 200. Detailed explanation for processing similar to that in the example described above will be omitted.

In the example described above, in step 101 (see FIG. 4, the same applies to below), the page creation server 200 acquires a database in which an HS flag is added to a predetermined item (the item "name" in the example described above) as printing source data containing highly confidential data with high confidentiality. The page creation server 200 may acquire a plurality of pieces of document data, some of which include HS flags added thereto, as printing source data containing highly confidential data.

More specifically, in step 101, the page creation server 200 receives, as printing source data, a plurality of pieces of (in this example, four) document data (the first document data M1, the second document data M2, the third document data M3, and the fourth document data M4). In this example, an HS flag is added to the fourth document data M4 out of the four pieces of document data.

Furthermore, the page creation server 200 also receives, as printing source data, a database D containing the items "company name", "name", and "amount" in step 101. In this example, addition or non-addition (ON or OFF) of an HS flag is set for each item, and an HS flag is added to none of the items (in other words, the HS flag is OFF).

Then, the page creation server 200 imposes the document data on paper and inserts objects in the database D into the imposed document data as in steps 102 and 103 described above.

Then, the page creation server 200 adds an HS flag, which is an example of high-confidentiality information indicating high confidentiality, to a page containing highly confidential data in step 104.

In this example, an HS flag is added in advance to the fourth document data M4 of the printing source data. In other words, in this example, the fourth document data M4 out of the plurality of pieces of document data is highly confidential data.

Thus, as illustrated in FIG. 7, the page creation server 200 adds the HS flag to the first page P1 of the created printing data on which the fourth document data M4 is imposed. In other words, the page creation server 200 causes the HS flag added to the fourth document data M4 of the printing source data to be inherited to the first page P1 of the printing data on which the fourth document data M4 is imposed.

Then, the page creation server 200 outputs the created printing data to the image conversion servers 300, as in step 105 described above.

In this example, the page creation server 200 divides the created printing data. The page creation server 200 outputs the first page P1 to which the HS flag is added in step 104 to the image conversion server 300A, and outputs the second page P2, the third page P3, and the fourth page P4 to which no HS flag is added in step 104 to the image conversion server 300B.

Thus, the series of processing operations by the page creation server 200 is completed.

In the example described above, the case where an HS flag is added to only one of document data and an object in a database of printing source data received by the page creation server 200 has been described. However, the present disclosure is not limited to this case. An HS flag may be added to both document data and an object in a database of printing source data.

In this case, in step 104 described above, the page creation server 200 may add an HS flag to both a page in which document data to which an HS flag is added is inserted and a page in which an object belonging to an item to which an HS flag is added is inserted of the created printing data.

In the example described above, the page creation server 200 creates printing data of one or more pages by combining a plurality of pieces of printing source data. However, printing data created by the page creation server 200 does not necessarily have a page.

That is, the page creation server 200 may create printing data not divided into pages by combining document data and an object in a database as a plurality of pieces of printing source data. In this case, in the case where an HS flag is added to document data or a database as printing source data, the page creation server 200 causes the crated printing data to inherit the HS flag of the printing source data. Accordingly, a user is able to recognize that the created printing data contains highly confidential data.

Furthermore, in the above-described example, in the printing system 1, the page creation server 200 imposes document data and inserts an object belonging to a database to create each page of printing data, and then, the image conversion server 300 performs rasterization processing on the page of the printing data to obtain a rasterized image. However, the present disclosure is not limited to the above.

For example, after obtaining a rasterized image of document data by performing rasterization processing on the document data into which an object belonging to a database is inserted, the printing system 1 may create each page of printing data by imposing the rasterized image of the document data. In this case, at the time of imposing the rasterized image of the document data to create each page of printing data, an HS flag may be added to the page in which a rasterized image containing highly confidential data is imposed.

The technical scope of the present disclosure is not limited to the scope of the exemplary embodiments described above. It is obvious from the description of the claims that changes or improvements made to the foregoing exemplary embodiments are also included in the technical scope of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
receive a printing instruction of a print job from a terminal apparatus;
create individual pages of printing data by combining a plurality of pieces of source data of the print job, wherein the individual pages comprise a first page containing highly confidential data with high confidentiality and a second page not containing highly confidential data with high confidentiality;
add high-confidentiality information indicating high confidentiality to the first page of the printing data and not add the high-confidentiality information to the second page of the printing data to generate processed printing data; and
output the processed printing data to at least one processing device.

2. The information processing apparatus according to claim 1, wherein the processor is configured to receive selection of the highly confidential data from the plurality of pieces of source data from the terminal apparatus.

3. The information processing apparatus according to claim 2, wherein the processor is configured to:
receive from the terminal apparatus the plurality of pieces of source data in which the high-confidentiality information has been added in advance to the selected highly confidential data; and
cause the high-confidentiality information added to the highly confidential data to be inherited to the page of the printing data that contains the highly confidential data.

4. The information processing apparatus according to claim 2,
wherein the plurality of pieces of source data contain a plurality of pieces of document data to be imposed on pages of the printing data, and
wherein the processor is configured to receive the selection of the highly confidential data from the plurality of pieces of document data and add the high-confidentiality information to a page on which the selected document data is imposed.

5. The information processing apparatus according to claim 2,
wherein the plurality of pieces of source data contain a plurality of pieces of document data to be imposed on pages of the printing data and a plurality of elements managed for each predetermined item and to be inserted into the imposed document data, and
wherein the processor is configured to receive the selection of the highly confidential data for the item from among the plurality of elements and add the high-confidentiality information to a page containing the document data in which the element belonging to the item is inserted.

6. The information processing apparatus according to claim 1, wherein the processor is configured to add, for individual printing instructions or for individual terminal apparatuses, different pieces of high-confidentiality information to pages containing the highly confidential data.

7. The information processing apparatus according to claim 1, wherein the processor is configured to transmit identification information for identifying the printing instruction to a printer that performs printing of the printing data and, in a case where the identification information is authenticated by the printer, output a page of the printing data to which the high-confidentiality information is added to the printer.

8. The information processing apparatus according to claim 1, wherein the processor is configured to, in a case where the printing data not containing a page is created by combining the plurality of pieces of source data, add the high-confidentiality information to the printing data.

9. A printing system comprising:
an information processing apparatus that creates a printing instruction of a print job from a terminal apparatus, creates individual pages of printing data by combining a plurality of pieces of source data of the print job, wherein the individual pages comprise a first page containing highly confidential data with high confidentiality and a second page not containing highly confidential data with high confidentiality,
wherein the information processing apparatus adds high-confidentiality information indicating high confidentiality to the first page of the printing data and does not add the high-confidentiality information to the second page of the printing data to generate processed printing data; and
a printer that acquires the processed printing data outputted from the information processing apparatus and forms, based on the processed printing data, an image on a recording medium,
wherein the printer adds a high-confidentiality image indicating high confidentiality to the page to which the high-confidentiality information is added and performs printing.

10. A non-transitory computer readable medium storing a program causing a computer to execute a process comprising:
receiving a printing instruction of a print job from a terminal apparatus;
creating individual pages of printing data by combining a plurality of pieces of source data of the print job, wherein the individual pages comprise a first page containing highly confidential data with high confidentiality and a second page not containing highly confidential data with high confidentiality;
adding high-confidentiality information indicating high confidentiality to the first page of the printing data and not add the high-confidentiality information to the second page of the printing data to generate processed printing data; and
outputting the processed printing data to at least one processing device.

11. The non-transitory computer readable medium according to claim 10, wherein the process includes receiving selection of the highly confidential data from the plurality of pieces of source data from the terminal apparatus.

12. The non-transitory computer readable medium according to claim 11, wherein the process includes:
receiving from the terminal apparatus the plurality of pieces of source data in which the high-confidentiality information has been added in advance to the selected highly confidential data; and
causing the high-confidentiality information added to the highly confidential data to be inherited to the page of the printing data that contains the highly confidential data.

13. The non-transitory computer readable medium according to claim 11,
wherein the plurality of pieces of source data contain a plurality of pieces of document data to be imposed on pages of the printing data, and
wherein the process includes receiving the selection of the highly confidential data from the plurality of pieces of document data and adding the high-confidentiality information to a page on which the selected document data is imposed.

14. The non-transitory computer readable medium according to claim 11,
wherein the plurality of pieces of source data contain a plurality of pieces of document data to be imposed on pages of the printing data and a plurality of elements managed for each predetermined item and to be inserted into the imposed document data, and
wherein the process includes receiving the selection of the highly confidential data for the item from among the plurality of elements and adding the high-confidentiality information to a page containing the document data in which the element belonging to the item is inserted.

15. The non-transitory computer readable medium according to claim 10, wherein the process includes outputting the individual pages of the printing data to a plurality of processing devices that perform predetermined processing operations.

16. The non-transitory computer readable medium according to claim 10, wherein the process includes adding, for individual printing instructions or for individual terminal apparatuses, different pieces of high-confidentiality information to pages containing the highly confidential data.

17. The non-transitory computer readable medium according to claim 10, wherein the process includes transmitting identification information for identifying the printing instruction to a printer that performs printing of the printing data and, in a case where the identification information is authenticated by the printer, outputting a page of the printing data to which the high-confidentiality information is added to the printer.

18. The non-transitory computer readable medium according to claim 10, wherein the process includes, in a case where the printing data not containing a page is created by combining the plurality of pieces of source data, adding the high-confidentiality information to the printing data.

19. The information processing apparatus according to claim 1,
wherein a first portion of the processed printing data in which the high-confidentiality information is added is output to a first processing device that performs a first predetermined operation on the first portion of the processed printing data, and
wherein a second portion of the processed printing data in which the high-confidentiality information is not added is output to a second processing device that performs a second predetermined operation on the second portion of the processed printing data.

20. The information processing apparatus according to claim 1,
wherein the first page of the processed printing data is outputted to a first image conversion server to perform rasterization processing thereon to create a first rasterized image; and
wherein the second page of the printed data is outputted to a second image conversion server with a confidentiality lower than that of the first image conversion server to perform rasterization processing thereon to create a second rasterized image, and
wherein the first rasterized image and the second rasterized image are outputted to a printer.

* * * * *